United States Patent [19]
Heslop

[11] Patent Number: 5,961,566
[45] Date of Patent: Oct. 5, 1999

[54] ENGINE SPEED CONTROL WITH OPTIONAL CRUISE CONTROL

[75] Inventor: Garon Nigel Heslop, Billericay, United Kingdom

[73] Assignee: Ford Global Technologies, Inc., Dearborn, Mich.

[21] Appl. No.: 09/160,686

[22] Filed: Sep. 25, 1998

[30] Foreign Application Priority Data

Sep. 30, 1997 [GB] United Kingdom .................... 9720776

[51] Int. Cl.[6] .................................................. B60K 31/00
[52] U.S. Cl. .............................. 701/93; 701/91; 180/170; 180/179; 123/319; 123/339.1; 123/349
[58] Field of Search ..................... 701/93.5, 91; 123/319, 123/328, 339.1, 349; 180/170, 178.9

[56] References Cited

U.S. PATENT DOCUMENTS 5,155,687  10/1992  Katayama .................................. 701/94
5,624,005  4/1997  Torii ......................................... 180/179

FOREIGN PATENT DOCUMENTS 0353072  1/1990  European Pat. Off. .

Primary Examiner—William A. Cuchlinski, Jr.
Assistant Examiner—Yonel Beaulieu
Attorney, Agent, or Firm—Allan J. Lippa

[57] ABSTRACT

An apparatus and a method for controlling engine speed in a motor vehicle engine (9) by an engine management system (1) with an engine control output (8,46). The engine management system (1) provides the following operations. A driver demand controller (38) responsive to an accelerator pedal (12) provides a first control signal (40) representative of a target engine speed. A cruise speed controller (22) responsive to a cruise control setting and vehicle speed provides a cruise signal (28). An idle speed controller (30) provides an idle signal (32). A combined idle-cruise speed controller (36) provides a second control signal (42) representative of a target engine speed which is responsive to the greater of the cruise signal (28) and idle signal (32). The greater of the first (40) or second (42) signals is selected to control (8,46) engine speed. When there is no cruise control, the apparatus is defaulted to a condition in which the combined idle-cruise speed controller (36) is responsive only to the idle signal (32).

5 Claims, 2 Drawing Sheets

ENGINE SPEED CONTROL WITH OPTIONAL CRUISE CONTROL

FIELD OF THE INVENTION

The present invention relates to an apparatus and a method for controlling engine speed in a motor vehicle engine, and which may optionally include means by which cruise control may be set.

BACKGROUND OF THE INVENTION

Many different systems have been proposed for setting the cruise control in a motor vehicle, for example, a motor car. The most common approach is to use a signal from vehicle speed sensor, which may be the same as the speedometer sensor, as a reference signal which is compared with a second reference signal which is held at a steady value following activation of the cruise control by the driver. The speed signal will, in general, vary as the vehicle is being driven, for example, owing to changes in road gradient, head wind, or the demands placed upon the engine power output from accessories such as a vehicle air conditioning unit.

The difference between the speed and reference signals may then be used as measure of whether or not the engine is supplying the right power to maintain the vehicle speed with the set cruise control speed. Usually the difference is used to physically control an engine throttle setting, for example, through an actuator linked to the accelerator pedal. One example of a prior art system is disclosed in EP 0 353 072 A1, in which a throttle value is physically controlled after a dedicated engine control unit has made in software a simultaneous selection of a maximum of an idle, cruise or driver demand signals.

Apart from the need to design a dedicated engine control unit, certain disadvantages have been noted with this general approach. First, the need to control the throttle physically with an actuator adds cost and complexity, compared with a vehicle having no such actuator. A limitation of some systems which rely upon an actuator is that the cruise control speed is not set immediately upon activation of the cruise control by the driver but takes some seconds to become activated as the actuator moves from an off position to a position corresponding to the current accelerator pedal setting.

Another difficulty arises from providing space for the physical components associated with an actuator, and its supply of power, within the limited space available in the engine compartment. The provision of these components adds cost, and consequently cruise control is often an optional accessory.

Another disadvantage in vehicles having electronic engine management (EEM) systems is that the relationship between pedal position and throttle setting is dependent upon many parameters, such as engine temperature, and in the case of an automatic transmission other parameters may include the gear selected, the rate of change of pedal position, and changes of gear. Inclusion of the cruise control feedback loop within the driver demand part of the EEM system increases the complexity of designing and programming the engine management system.

A further problem is that the vehicle speed sensor, for example, a sensor which detects a rotating magnet or which uses the Hall effect, may not give a precise indication of vehicle speed and may provide a speed signal which lags the actual vehicle speed. The cruise control system may therefore be slow in responding to changes in vehicle speed.

SUMMARY OF THE INVENTION

According to the invention, there is provided an apparatus for controlling engine speed in a motor vehicle engine, which may be connected to means by which cruise control may be set, comprising: an accelerator pedal, means by which an actual vehicle speed may be calculated, and an engine management system with an engine control output for regulating engine speed; the engine management system comprising: a driver demand controller responsive to the position of the accelerator pedal to provide a first control signal representative of a target engine speed, a cruise speed controller responsive to the cruise control setting and vehicle speed to provide a cruise signal representative of a target engine speed, an idle speed controller to provide an idle signal representative of a target idle speed; characterized in that the engine management system comprises: a combined idle-cruise speed controller to provide a second control signal representative of a target engine speed and responsive to the greater of the cruise signal and idle signal, and means to select either the first or the second control signal, whichever is representative of the greater target engine speed, to generate the engine control output.

Also, according to the invention, there is provided a method for controlling engine speed in a motor vehicle which may be provided with a means by which cruise control may be set, and which has an engine management system with an engine control output for regulating engine speed, the engine management system comprising a driver demand controller, a cruise speed controller, and an idle speed controller, the method comprising the steps of: i) providing to the cruise speed controller a target cruise speed signal representative of a target vehicle cruising speed; ii) providing to the cruise speed controller a speed signal representative of the actual vehicle speed; iii) using the cruise speed controller to provide a cruise signal representative of a target engine speed, the cruise signal being dependent upon the speed signal and the target cruise speed signal; iv) using the idle speed controller to provide an idle signal representative of a desired engine idling speed; v) providing to the driver demand controller an input signal that is responsive to an accelerator pedal setting; vi) using the driver demand controller to provide a first control signal representative of a target engine speed, the first control signal varying in accordance with said input to the driver demand controller; characterized in that the engine management system comprises a combined idle-cruise speed controller, and in that the method comprises the steps of: vii) providing to the idle-cruise speed controller an input signal that is responsive to the greater of the cruise signal and idle signal; viii) using the idle-cruise speed controller to provide a second control signal representative of a target engine speed, the second control signal varying in accordance with said input to the idle-cruise speed controller; ix) selecting either the first or the second control signal whichever is representative of the greater target engine speed as the engine control output.

The combined idle-cruise controller can advantageously be essentially the same as a dedicated idle controller, the difference residing in that there is either a comparator means to select the greater of the cruise and idle signals and pass this to the input to the combined idle-cruise controller, or that the comparator means is integrated with the idle-cruise controller, which then takes as two inputs the cruise and idle signals. The comparator means may be an analog comparator circuit that has as its inputs lines carrying analog voltages. However, such means may equivalently be implemented using digital techniques, and may also be implemented in software.

The arrangement of hardware and/or software inside the electronic engine management system therefore can share much in common with an electronic management system not including any provision for cruise control. There is, therefore, no need to design a dedicated engine control unit to perform cruise control. The present invention therefore permits prior art electronic management systems to be readily adapted to include cruise control.

Since cruise control is often an optional feature of a motor vehicle, it is therefore preferable if the apparatus and method can be used in a vehicle both with and without cruise control. When there are no means by which cruise control may be set, the cruise speed controller may be defaulted to a condition in which only the idle signal is available so that the combined idle-cruise speed controller is responsive only to the idle signal. This may be done in different ways. For example, software running in the electronic engine management system may override operation of the comparator means so that this selects only the idle signal for the combined idle-cruise controller.

Alternatively, the target cruise signal may default or be tied to a voltage which is representative of a zero setting of a target cruise speed whenever there is no input from cruise control, so that the target cruise signal will always be representative of a target engine speed less than that represented by the idle signal. The result is then that the input signal to the combined idle-cruise controller is always responsive only of the idle signal.

In a preferred embodiment of the invention, the cruise speed controller receives a speed signal representative of an actual vehicle speed, and an engine speed signal representative of an actual engine speed, from which the cruise speed controller calculates a gearing ratio, which together with the cruise speed signal allows the cruise speed controller to provide the cruise signal. If the gearing ratio relates engine speed to vehicle speed, then a cruise signal representative of a target vehicle speed may be generated by multiplying the gearing ratio with a target cruise speed.

The measurement and calculation of an actual gearing ratio allows the invention to be used with both automatic and manual transmissions.

In order to obtain the full benefits of volume production, it is useful if the apparatus can be fitted to a range of motor vehicles, for example, front or rear wheel drive, and vehicles with different tire sizes. A front wheel drive vehicle would normally have a unitary axle ratio, and a rear wheel drive will usually have a non-unitary axle ratio, owing to the rear wheel differential gearing.

Since motor vehicles conventionally have a drive shaft, and wheels driven by the axle, the apparatus may comprise a sensor arrangement to measure the rotational speed of the drive shaft, or equivalently any other part of a vehicle drive train between the transmission and a road-going wheel, and so produce the vehicle speed signal. The engine management system may then comprise a memory that stores data representative of a drive shaft/axle ratio and of a tire size. When such data are recalled from memory, the speed signal representative of actual vehicle speed may be calculated from the drive shaft rotational speed, axle ratio and tire size.

Of course, there will normally be a transmission between an engine crankshaft and the drive shaft. The engine speed may then be measured using known techniques such as a Hall effect sensor proximate a toothed wheel on the crankshaft, whereupon the gearing ratio can be calculated from the vehicle speed and engine speed.

An advantage of this approach is that there may be no need to provide an additional engine speed sensor, as such sensors are usually needed for other purposes, for example, in scheduling engine spark or injection events. One such type of sensor detects the presence of teeth around the circumference of a toothed wheel on the engine crankshaft. Such a sensor may have 36 teeth around the circumference in order to give an engine speed measurement accurate enough to schedule a spark or injection event with a few degrees of engine revolution. While such accuracy is not necessary to achieve steady cruise control, the use of such a sensor to measure engine speed, permits an improvement in accuracy and response time compared with sensors based on detecting eddy currents generated by rotating magnets such as those used in speedometers.

The apparatus may be adapted for use either with diesel or gasoline engines, and this may be done with appropriate changes in software. If the engine is a diesel engine, in which torque will vary essentially linearly with fuel supply to the cylinders, then the first and second control signals are fuel demand signals, i.e., representative of a quantity of diesel fuel to be supplied to the engine.

If the engine is a gasoline engine, in which torque will not in general vary linearly with an amount of fuel supplied, the first and second control signals are torque demand signals, that can then be translated into appropriate fuel demand and spark timing signals.

The engine idling speed, whether for a diesel or a gasoline internal combustion engine, will normally be set to be about 800 rpm when the engine is warm. During and shortly after start-up, the speed may be somewhat higher.

By using the combined idle-cruise speed controller as a means to control a set cruise control speed, there is no need to control the throttle or the accelerator position mechanically with an actuator. Furthermore, because the cruise control is implemented through the idle-cruise speed controller, the cruise control may be implemented independently from the driver demand control. The driver demand control in many motor vehicles, particularly those with electronic engine management systems, employs software and look-up tables covering the whole range of expected drive and engine conditions, and produces an engine control output that may be dependent on many input variables from engine and transmission sensors. Implementing the cruise control within the engine idle control and separately from the relatively complex driver demand system, simplifies the design of the cruise control and driver demand or engine management systems.

BRIEF DESCRIPTION OF THE DRAWINGS

The invention will now be described by way of example, with reference to the accompanying drawings, in which.

DESCRIPTION OF THE PREFERRED EMBODIMENT

Figure 1:
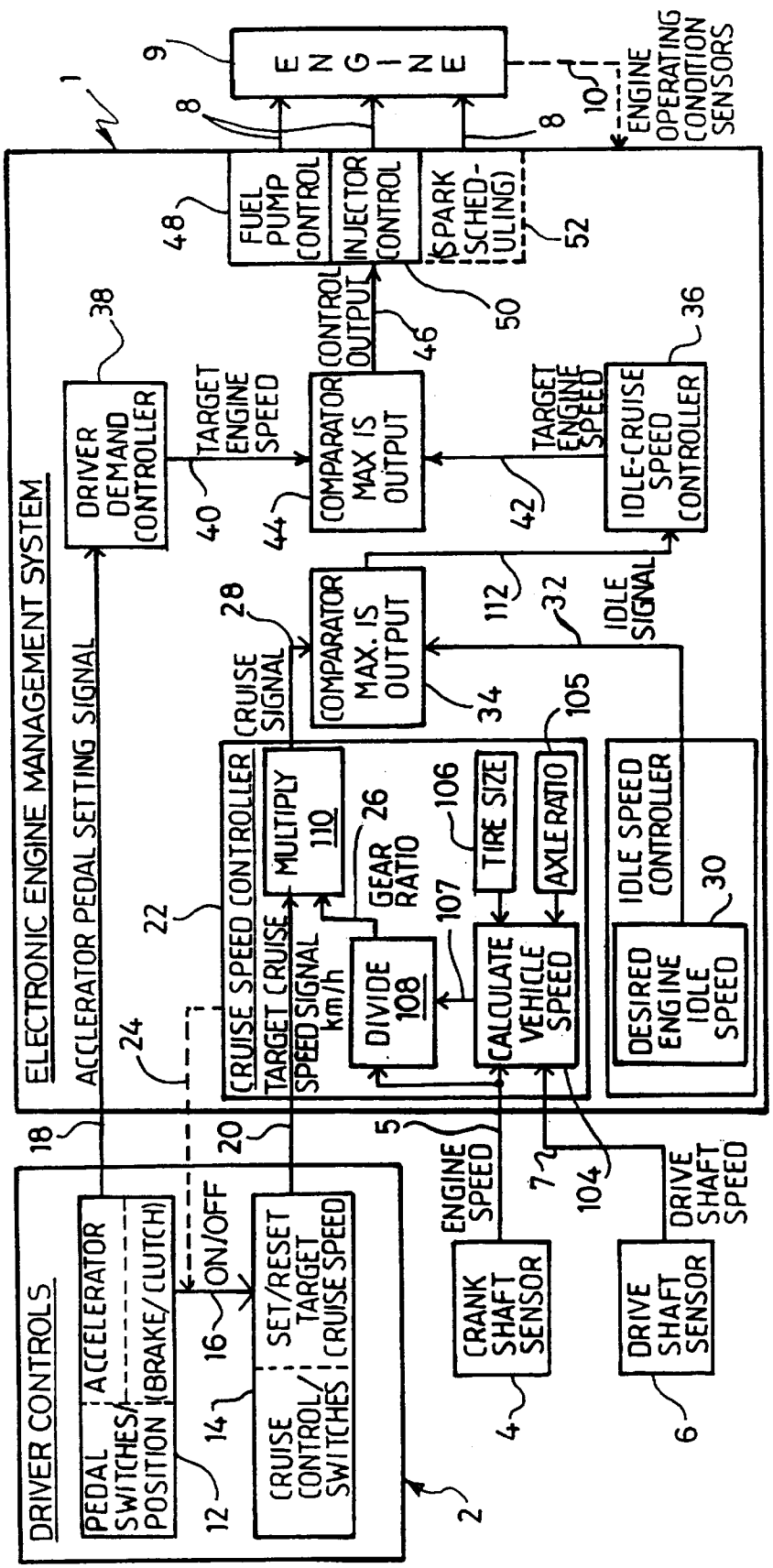
FIG. 1 shows a schematic block diagram of a driver demand, cruise control and engine idling speed control apparatus for a motor vehicle, according to the invention.

In FIG. 1, an electronic engine management (EEM) system 1 receives inputs from driver controls 2, a crank shaft sensor 4, a drive shaft sensor, and provides outputs 8 to an internal combustion engine 9, for example, in a motor car (not shown). The engine 9 will, in general, provide other signals, shown by the dashed line 10, representative of various engine operating parameters such as temperature, oil pressure, battery voltage, etc., which the EEM system 1 may use as inputs in order to generate the desired outputs 8.

Although not illustrated in detail, the crankshaft sensor 4 is a conventional toothed wheel on the crankshaft, which provides an engine speed signal 5 in the form of thirty-six pulses for each revolution of the engine 9. A drive shaft sensor 6, also not shown, comprises a cable with a rotatable core which is driven by the rotation of the propeller or drive shaft, and which in turn rotates a magnet. A Hall effect sensor is then used to measure the rotating magnetic field and to generate a drive shaft speed signal 7 in the form of an analog voltage which is then a measure of the rate of rotation of the cable and drive shaft.

The driver controls illustrated include an accelerator, brake (and optionally clutch) pedals 12, and also cruise control operation switches and circuitry 14, by which the cruise control may be activated, set, reset and deactivated. The clutch and brake pedals will normally be provided with switches which detect the slightest movement of the pedals away from the rest position, so that the cruise control may be deactivated 16 as soon as a driver acts to slow the vehicle or to disengage the transmission. The accelerator pedal is part of an assembly (not shown) which provides an analogue electrical signal 18, indicative of the amount by which the pedal is depressed, to the EEM system 1.

The cruise control switches and circuitry 14 will most commonly be provided on a steering column stalk or on the steering wheel itself (not shown). When the cruise control is set, a non-zero voltage is provided as a target cruise speed signal 20 by the cruise switches and circuitry 14 to the EEM system.

Optionally, the EEM system may be used in a vehicle that does not have cruise control, in which case the target cruise speed signal is made zero by a pull down resistance internal to the cruise speed controller 22.

Figure 2:
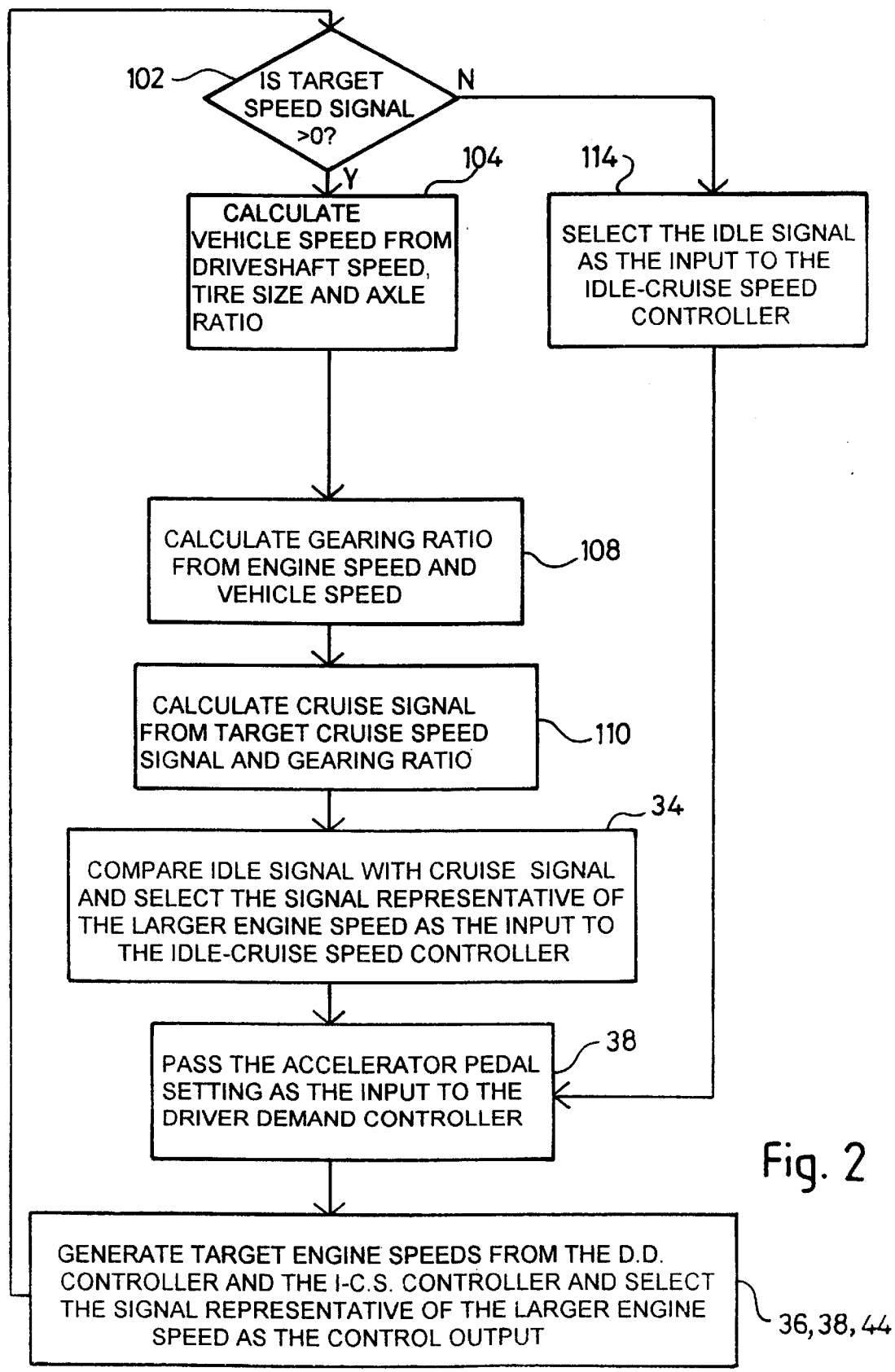
FIG. 2 shows a flow chart describing the steps taken in generating an engine control output with the block diagram of FIG. 1.

With reference now also to FIG. 2, when the cruise control is set, the EEM system detects 102 the non-zero target speed signal 20, and then in a cruise speed controller 22 calculates 104 first a vehicle speed 104 according to the drive shaft speed signal 7.

A gearing ratio 26 may then be calculated 108 from the vehicle speed and the engine speed signal 5, by dividing the engine speed by the vehicle speed.

The cruise speed controller 22 then calculates 110 as an output a cruise signal 28 by multiplying the target cruise speed signal 20 by the gearing ratio 26.

The EEM system will normally have integrated with the system, circuitry 30 necessary to control the idle speed. This will have the usual features associated with such control, for example, with a faster idle speed during warm up of the engine 9. This idle speed circuitry 30 provides an idle signal 32, which is then compared with the cruise signal 28 in a first 'max-output' comparator 34.

The first comparator 34 selects the signal representative of the greater engine speed and provides this as an input 112 to a combined idle-cruise speed controller 36. In the event that the cruise control 14 is switched off, or not installed in the motor vehicle, the target speed signal 20 will be zero, as will be the cruise signal 28, and so, in this instance, the first comparator will pass 114 just the idle signal 32 as the input to the combined idle-cruise controller 36.

In parallel with the above operations, the accelerator pedal setting signal 18 is being passed continuously to a driver demand controller 38. The driver demand controller 38 and the idle-cruise controller each produce an output 40,42 representative of a target engine speed, and these are each passed to a second 'max-output' comparator 44 which selects the input representative of the larger target engine speed as a control output 46 for regulating the engine speed.

The control output 46 may then be used, optionally with other signals such as those from engine operating condition sensors 10, by the EEM system 1 to generate the signals needed to run a fuel pump control 48, an injector control 50, and, in the case of a gasoline engine, also the spark scheduling 52.

The apparatus and method described above allow the elimination of the need to have an actuator to physically move the accelerator pedal. The cruise speed controller may then be implemented in electronics and software, for example, within an EEM system module. This allows a reduction in manufacturing cost. The separation of the cruise speed controller from the driver demand controller also simplifies the design and programming of the driver demand controller, the so-called mapping of the accelerator pedal setting and other engine parameters, with a desired control output 46. The use of an engine speed signal from the crankshaft improves the response of the cruise control feedback loop to follow changes in vehicle or engine speed and keep the vehicle speed steady. The use of a combined idle-cruise speed controller 36 taking as its input either a cruise signal or an idle signal allows the EEM system to be used in vehicles both with and without cruise control.

I claim:

1. An apparatus for controlling engine speed in a motor vehicle engine (9), and which is connected to means (14) by which cruise control is set (20), comprising: an accelerator pedal (12); means (104) by which an actual vehicle speed is calculated; and an engine management system (1) with an engine control output (8,46) for regulating engine speed; the engine management system (1) comprising: a driver demand controller (38) responsive to the position (18) of the accelerator pedal (12) to provide a first control signal (40) representative of a target engine speed; a cruise speed controller (22) responsive to the cruise control setting and vehicle speed to provide a cruise signal (28) representative of a target engine speed; an idle speed controller (30) to provide an idle signal (32) representative of a target idle speed; a combined idle-cruise speed controller (36) to provide a second control signal (42) representative of a target engine speed and responsive to the greater of the cruise signal (28) and idle signal (32); and means (44) to select either the first (40) or the second (42) control signal, whichever is representative of the greater target engine speed, to generate the engine control output (8,46).

2. An apparatus as claimed in claim 1, in which the cruise speed controller (22) receives a speed signal (107) representative of an actual vehicle speed, and an engine speed signal (5) representative of an actual engine speed, from which the cruise speed controller (22) calculates a gearing ratio (26), which together with the cruise speed signal (20) allows the cruise speed controller (22) to provide the cruise signal (28).

3. An apparatus as claimed in claim 2, further comprising a sensor arrangement (4) to measure the rotational speed of a drive shaft and to produce said speed signal (5), in which the engine management system (1) comprises a memory, the memory storing data representative of a drive shaft/axle ratio (105) and of a tire size (106), wherein the gearing ratio (26) is calculated from the vehicle speed (107) and said data (105,106).

4. An apparatus as claimed in claim 3, in which the cruise control setting (14) provides a signal (20) representative of a target cruise speed, the cruise signal (28) being generated from a product (110) of the gearing ratio (26) and said target cruise speed (20).

5. An apparatus as claimed in claim 4, in which the first (40) and second (42) control signals are torque demand signals.

* * * * *